(12) United States Patent
Gibson (10) Patent No.: US 6,371,859 B1
(45) Date of Patent: Apr. 16, 2002

(54) AXIALLY COLLAPSIBLE DRIVESHAFT ASSEMBLY

(75) Inventor: Daniel W. Gibson, Maumee, OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/497,566

(22) Filed: Feb. 3, 2000

(51) Int. Cl.$^7$ ................................................. F16C 3/00
(52) U.S. Cl. .................. 464/183; 180/232; 138/DIG. 11
(58) Field of Search .................................. 464/179, 183, 464/162; 74/492; 180/232; 138/26, 30, 100, 118, 174, 177, 178, DIG. 11; 280/777

(56) References Cited

U.S. PATENT DOCUMENTS

| | | | |
|---|---|---|---|
| 3,508,633 A | * 4/1970 | Nishimura et al. | 280/777 X |
| 3,599,757 A | 8/1971 | Takamatsu et al. | |
| 3,851,542 A | * 12/1974 | Adams et al. | 74/492 |
| 3,869,015 A | 3/1975 | Allison | |
| 3,903,982 A | 9/1975 | Van Winsen et al. | |
| 3,912,295 A | 10/1975 | Eggert, Jr. | |
| 4,512,209 A | * 4/1985 | Linnemeier | 74/492 |
| 4,531,619 A | * 7/1985 | Eckels | 74/492 X |
| 4,577,736 A | 3/1986 | Bongers | |
| 4,635,840 A | 1/1987 | Cenanovic | |
| 4,991,871 A | * 2/1991 | Sadakata | 74/492 X |
| 5,293,973 A | * 3/1994 | Thum | 280/777 X |
| 5,419,171 A | 5/1995 | Bumgarner | |
| 5,566,777 A | 10/1996 | Trommer et al. | |
| 5,813,438 A | * 9/1998 | Reed | 138/118 X |
| 5,819,594 A | * 10/1998 | Sjovall | |
| 5,979,386 A | * 11/1999 | Swars | 464/183 X |

FOREIGN PATENT DOCUMENTS

| | | | |
|---|---|---|---|
| DE | 29 14 657 A1 | * 10/1980 | 464/183 |
| DE | 41 13 709 A1 | * 10/1992 | 464/183 |
| EP | 683084 | 11/1995 | |
| EP | 1040954 | 10/2000 | |

OTHER PUBLICATIONS

JP–63002725 Abstract Jan. 1988.
DE–4113709 Abstract Oct. 1992.

* cited by examiner

Primary Examiner—Lynne H. Browne
Assistant Examiner—Greg Binda
(74) Attorney, Agent, or Firm—MacMillan, Sobanski & Todd, LLC (57) ABSTRACT

A driveshaft formed from a single piece of material having a constant diameter includes a controlled collapse zone in the interior thereof. The controlled collapse zone includes a collapse initiation portion, a collapse distance control portion, and a collapse termination portion. The collapse initiation portion extends from a first normally sized portion of the driveshaft and is preferably formed having a generally semi-circular bulge or bump shape that extends a relatively short axial distance. Preferably, the collapse initiation portion is formed having a diameter that is somewhat larger that the normal diameter of the driveshaft. The collapse distance control portion extends from the collapse initiation portion and is preferably formed having an elongated cylindrical shape that extends a relatively long axial length. Preferably, the collapse distance control portion is formed having a diameter that is slightly larger than the normal diameter of the driveshaft, but smaller than the diameter of the collapse initiation portion. The collapse termination portion extends from the collapse distance control portion to a second normally sized portion of the driveshaft and is preferably formed having a frusto-conical shape that extends a relatively short axial length. Preferably, the collapse termination portion tapers at a constant angle from the diameter of the collapse distance control portion to the normal diameter of the driveshaft.

39 Claims, 9 Drawing Sheets

AXIALLY COLLAPSIBLE DRIVESHAFT ASSEMBLY

BACKGROUND OF THE INVENTION

This invention relates in general to drive train systems for transferring rotational power from a source of rotational power to a rotatably driven mechanism. In particular, this invention relates to an improved driveshaft assembly for use in such a drive train system that is axially collapsible in the event of a collision to absorb energy.

Torque transmitting shafts are widely used for transferring rotational power from a source of rotational power to a rotatably driven mechanism. For example, in most land vehicles in use today, a drive train system is provided for transmitting rotational power from an output shaft of an engine/transmission assembly to an input shaft of an axle assembly so as to rotatably drive the wheels of the vehicle. To accomplish this, a typical vehicular drive train system includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

A recent trend in the development of passenger, sport utility, pickup truck, and other vehicles has been to design the various components of the vehicle in such a manner as to absorb energy during a collision, thereby providing additional safety to the occupants of the vehicle. As a part of this trend, it is known to design the drive train systems of vehicles so as to be axially collapsible so as to absorb energy during a collision. To accomplish this, the driveshaft tube may be formed as an assembly of first and second driveshaft sections that are connected together for concurrent rotational movement during normal operation, yet which are capable of moving axially relative to one another when a relatively large axially compressive force is applied thereto, such as can occur during a collision. A variety of such axially collapsible driveshaft assemblies are known in the art.

It has been found to be desirable to design axially collapsible driveshaft assemblies of this general type such that a predetermined amount of force is required to initiate the relative axial movement between the two driveshaft sections. It has further been found to be desirable to design these axially collapsible driveshaft assemblies such that a predetermined amount of force (constant in some instances, varying in others) is required to maintain the relative axial movement between the two driveshaft sections. However, it has been found that the manufacture of such axially collapsible driveshaft assemblies is somewhat difficult and expensive to manufacture than convention non-collapsible driveshafts. Thus, it would be desirable to provide an improved driveshaft assembly for use in a vehicular drive train system that is axially collapsible in the event of a collision to absorb energy and that is relatively simple and inexpensive in structure.

SUMMARY OF THE INVENTION

This invention relates to an improved driveshaft assembly for use in a vehicular drive train system that is axially collapsible in the event of a collision to absorb energy and that is relatively simple and inexpensive in structure. The driveshaft assembly includes a driveshaft that is preferably formed from a single piece of material having a constant diameter. However, a controlled collapse zone is formed in the interior of the driveshaft. The controlled collapse zone includes a collapse initiation portion, a collapse distance control portion, and a collapse termination portion. The collapse initiation portion extends from a first normally sized portion of the driveshaft and is preferably formed having a generally semi-circular bulge or bump shape that extends a relatively short axial distance. Preferably, the collapse initiation portion is formed having a diameter that is somewhat larger that the normal diameter of the driveshaft. The collapse distance control portion extends from the collapse initiation portion and is preferably formed having an elongated cylindrical shape that extends a relatively long axial length. Preferably, the collapse distance control portion is formed having a diameter that is slightly larger than the normal diameter of the driveshaft, but smaller than the diameter of the collapse initiation portion. The collapse termination portion extends from the collapse distance control portion to a second normally sized portion of the driveshaft and is preferably formed having a frusto-conical shape that extends a relatively short axial length. Preferably, the collapse termination portion tapers at a constant angle from the diameter of the collapse distance control portion to the normal diameter of the driveshaft.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
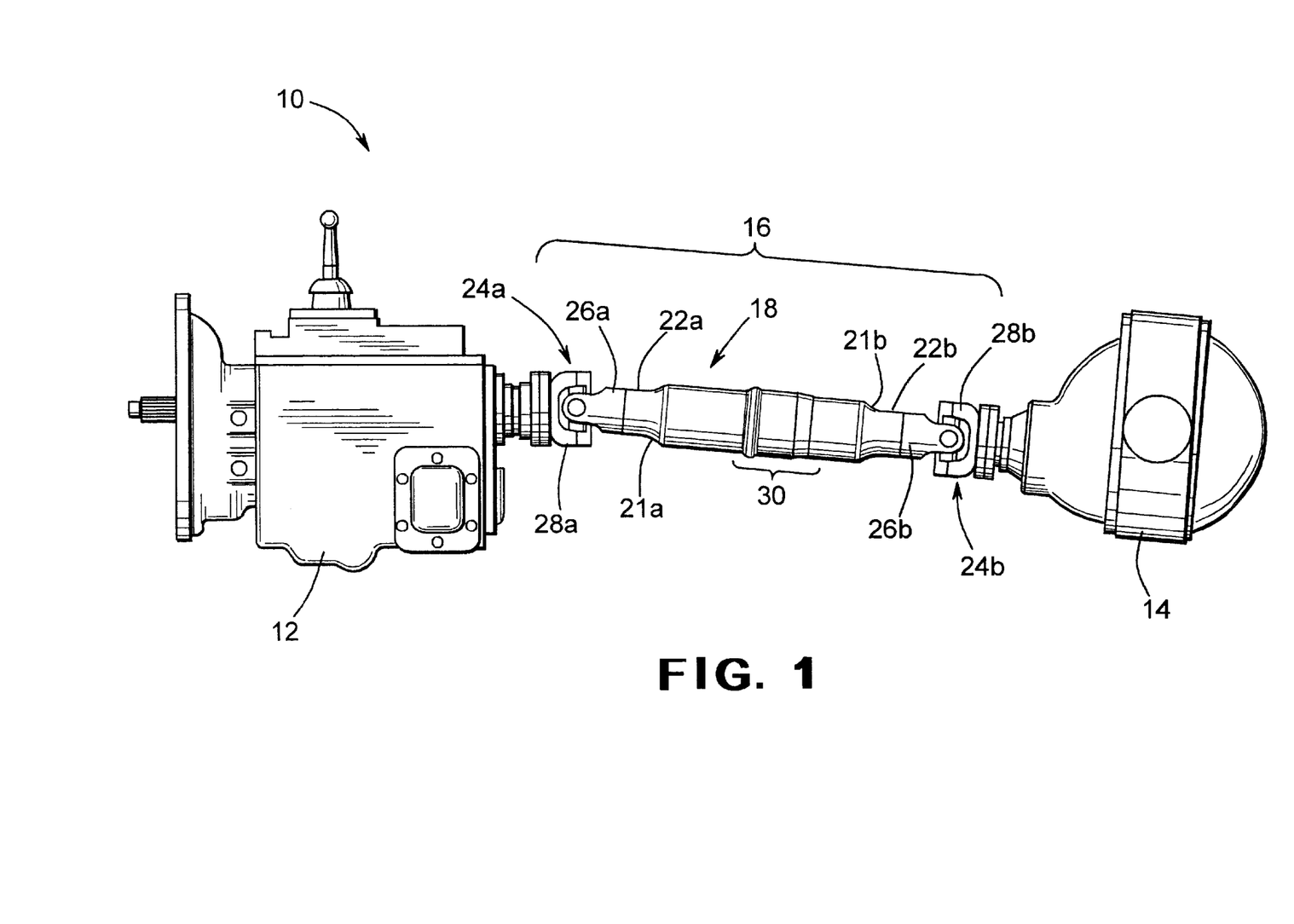
FIG. 1 is a schematic elevational view of a vehicle drive train assembly including a first embodiment of an axially collapsible driveshaft in accordance with this invention.

Referring now to the drawings, there is illustrated in FIG. 1 a vehicular drive train assembly, indicated generally at 10, in accordance with this invention. The drive train assembly 10 includes a transmission 12 having an output shaft (not shown) that is connected to an input shaft (not shown) of an axle assembly 14 through a driveshaft assembly 16. The transmission 12 is rotatably driven by an engine (not shown) or other source of rotational power in a conventional manner. The driveshaft assembly 16 includes a generally hollow and cylindrical driveshaft, a first embodiment of which is indicated generally at 18. The driveshaft 18 includes a center portion extending between a pair of opposed end portions 22a and 22b. In the illustrated embodiment, the center portion of the driveshaft 18 is formed having a larger outer diameter than either of the end portions 22a and 22b. Thus, respective transition regions 21a and 21b are defined between the larger diameter center portion of the illustrated driveshaft 18 and each of the smaller diameter end portions 22a and 22b thereof. However, the driveshaft 18 may be formed having a constant diameter throughout the length thereof or any other desired shape. Alternatively, the single driveshaft 18 may be replaced by a compound driveshaft assembly (not shown) having separate first and second driveshaft sections that are supported by a center bearing assembly between the transmission 12 and the axle assembly 14. The driveshaft 18 can be formed from any suitable material, such as a lightweight aluminum alloy (6061 alloy, for example).

The output shaft of the transmission 12 and the input shaft of the axle assembly 14 are typically not co-axially aligned for rotation. To accommodate this, a pair of universal joints, indicated generally at 24a and 24b, are provided at the end portions 22a and 22b of the driveshaft 18 to respectively connect the driveshaft 18 to the output shaft of the transmission 12 and to the input shaft of the axle assembly 14. The first universal joint 24a includes a first yoke, such as a tube yoke 26a, that is secured to the front end portion 22a of the driveshaft 18 by any conventional means, such as by welding or adhesives. The first universal joint 24a further includes a second yoke, such as a half round 28a, that is connected to the output shaft of the transmission 12. Similarly, the second universal joint 24b includes a first yoke, such as a tube yoke 26b, that is secured to the rear end portion 22b of the driveshaft 18 by any conventional means, such as by welding or adhesives. The second universal joint 24b further includes a second yoke, such as a half round end yoke 28b, that is connected to the input shaft of the axle assembly 14.

Figure 2:
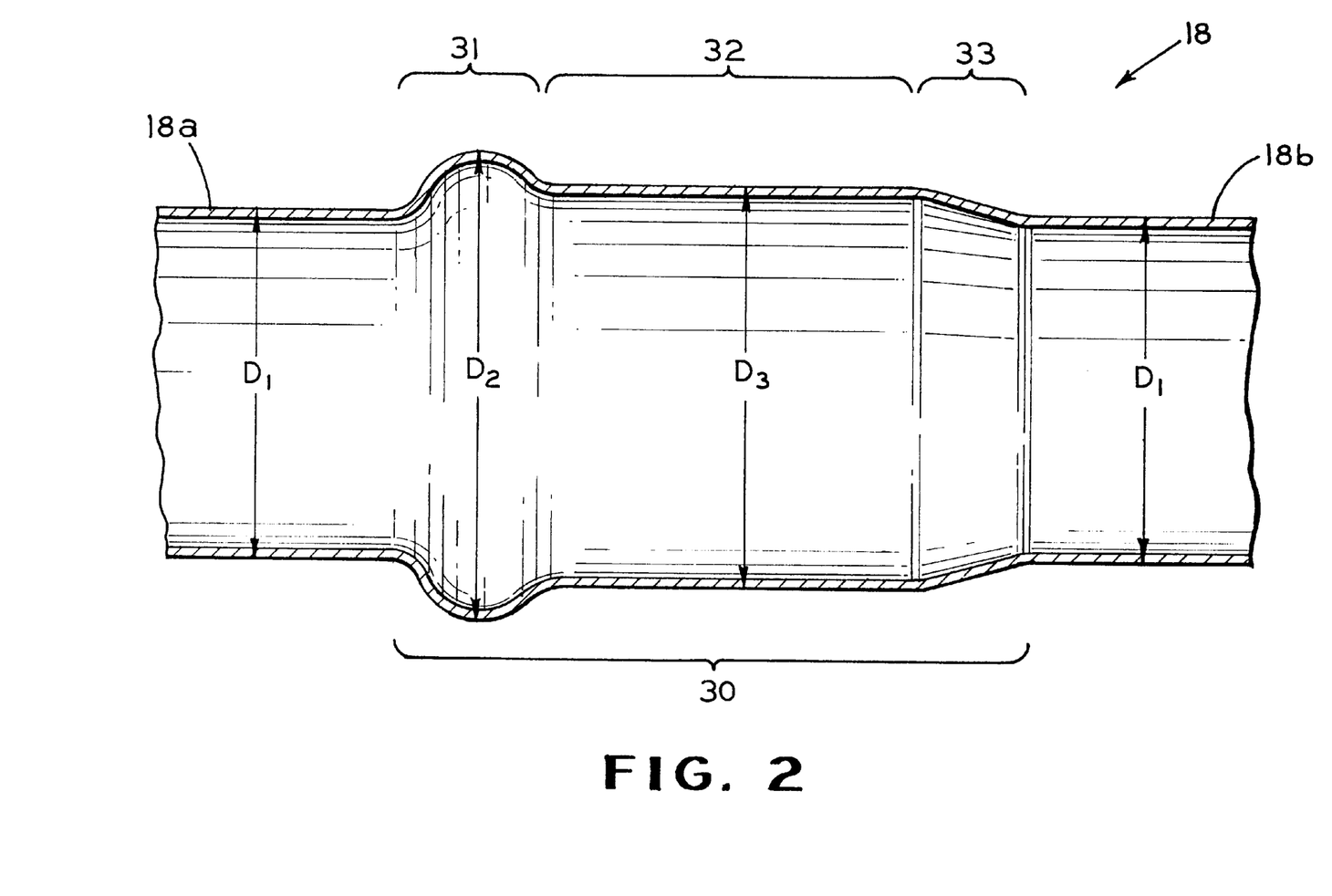
FIG. 2 is an enlarged sectional elevational view of a portion of the first embodiment of the axially collapsible driveshaft illustrated in FIG. 1.
Figure 3:
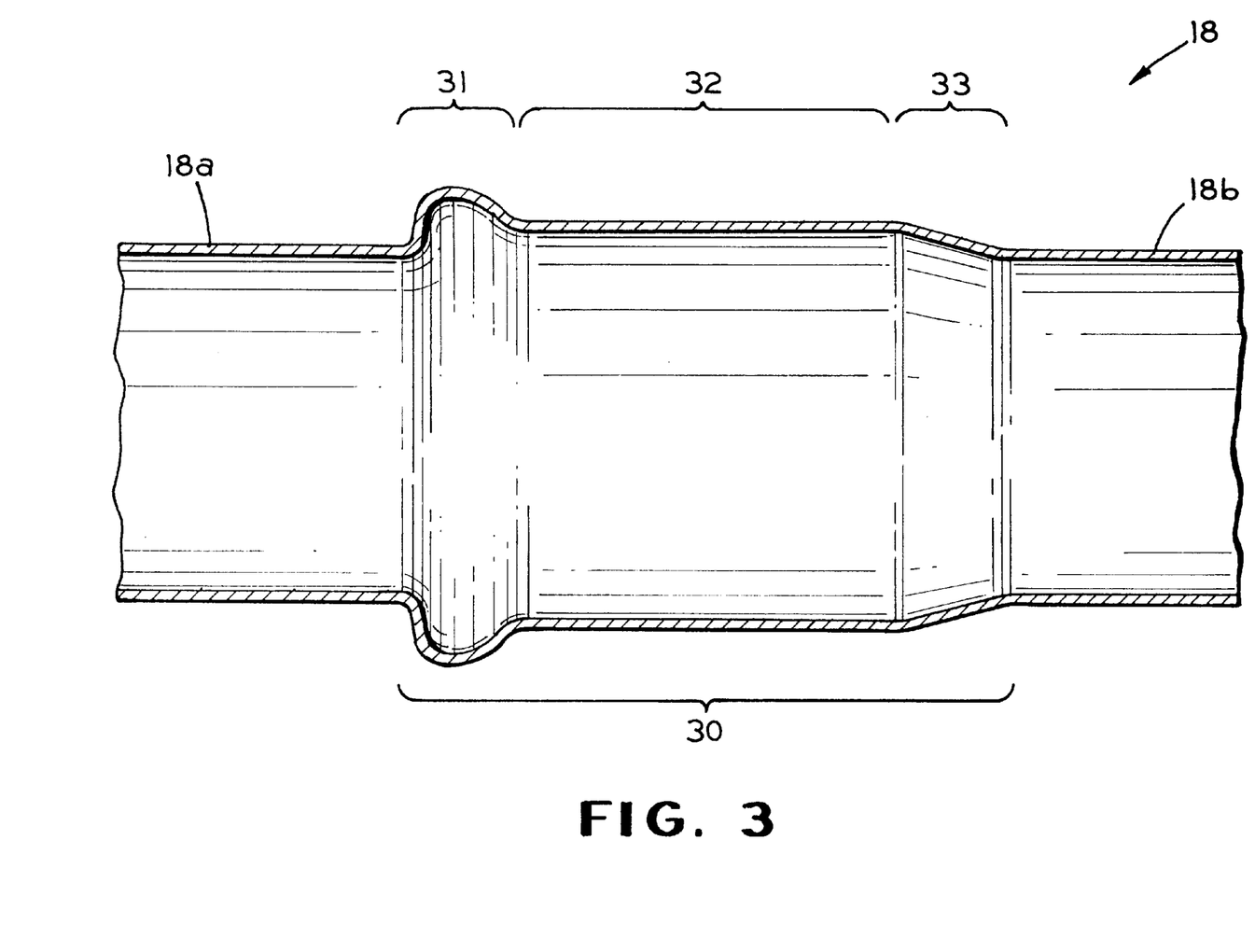
FIGS. 3, 4, 5, and 6 are enlarged sectional elevational views similar to FIG. 2 sequentially showing the first embodiment of the driveshaft as it is being axially collapsed.

Referring now to FIGS. 2 and 3, the structure of the driveshaft 18 is illustrated in detail. As shown therein, the driveshaft 18 is a unitary structure that is formed from a single piece of material, although such is not necessary. The driveshaft 18 can be formed to have the shape described below by any conventional process, including hydroforming, electromagnetic pulse forming, cold working, and the like.

Between the two end portions 22a and 22b, the driveshaft 18 is, for the most part, preferably formed having a normally sized constant diameter, as indicated at $D_1$. However, a controlled collapse zone, indicated generally at 30, is formed in the interior of the driveshaft 18. The controlled collapse zone 30 includes a collapse initiation portion 31, a collapse distance control portion 32, and a collapse termination portion 33. The collapse initiation portion 31 extends from a first normally sized portion 18a of the driveshaft 18 and is preferably formed having a generally semi-circular bulge or bump shape that extends a relatively short axial distance. Preferably, the collapse initiation portion 31 is formed having a diameter $D_2$ that is somewhat larger that the normal diameter $D_1$ of the driveshaft 18. The collapse distance control portion 32 extends from the collapse initiation portion 31 and is preferably formed having an elongated cylindrical shape that extends a relatively long axial length. Preferably, the collapse distance control portion 32 is formed having a diameter $D_3$ that is slightly larger than the normal diameter $D_1$ of the driveshaft 18, but smaller than the diameter $D_2$ of the collapse initiation portion 31. The collapse termination portion 33 extends from the collapse distance control portion 32 to a second normally sized portion 18b of the driveshaft 18 and is preferably formed having a frusto-conical shape that extends a relatively short axial length. Preferably, the collapse termination portion 33 tapers at a constant angle from the diameter $D_3$ of the collapse distance control portion 32 to the normal diameter $D_1$ of the driveshaft 18.

During normal operation of the drive train assembly 10, torque is transmitted from the transmission 12 through the driveshaft assembly 16 to the axle assembly 14. As discussed above, the front end portion 22a of the driveshaft 18 is connected to the output shaft of the transmission 12 by the first universal joint 24a, and the rear end portion 22b of the driveshaft 18 is connected to the input shaft of the axle assembly 14 by the second universal joint 24b. The controlled collapse zone 30 of the driveshaft 18 is sized to accommodate the transmission of such torque without any deformation under normal operating conditions. Thus, during such normal operation of the drive train assembly 10, no relative axial movement occurs between the first portion 18a and the second portion 18b of the driveshaft 18.

However, if a relatively large axial force is applied to the front and rear end portions 22a and 22b of the driveshaft 18, the controlled collapse zone 30 is designed to allow relative axial movement to occur between the first portion 18a and the second portion 18b of the driveshaft 18. This situation is sequentially shown in FIGS. 3 through 6, wherein the overall length of the driveshaft 18 collapses or axially shortens, thereby absorbing energy during this process. Typically, the axial forces that are generated during a front-end impact of the vehicle with another object are sufficiently large as to cause this collapse to occur. Such collapsing functions to absorb energy during a collision, thereby providing additional safety to the occupants of the vehicle.

During the initial stage of such axial collapse shown in FIG. 3, the first portion 18a of the driveshaft 18 is moved axially relative to the second portion 18b thereof. As a result, the collapse initiation portion 31 of the controlled collapse zone 30 begins to deform axially. As shown in FIG. 3, the collapse initiation portion 31 is axially compressed from its original generally semi-circular bulge or bump shape. Preferably, the collapse distance control portion 32 and the collapse termination portion 33 are not deformed to a significant extent during this initial stage of axial collapse. The amount of axial force that is necessary to initially deform the collapse initiation portion 31 will depend upon a variety of factors, including the physical size and shape of the driveshaft 18, the type of material that is used to form the driveshaft 18, and the size and shape of the collapse initiation portion 31. By varying these and other factors, the amount of axial force that is necessary to initially deform the collapse initiation portion 31 of the driveshaft 18 can be selected as desired.

Figure 4:
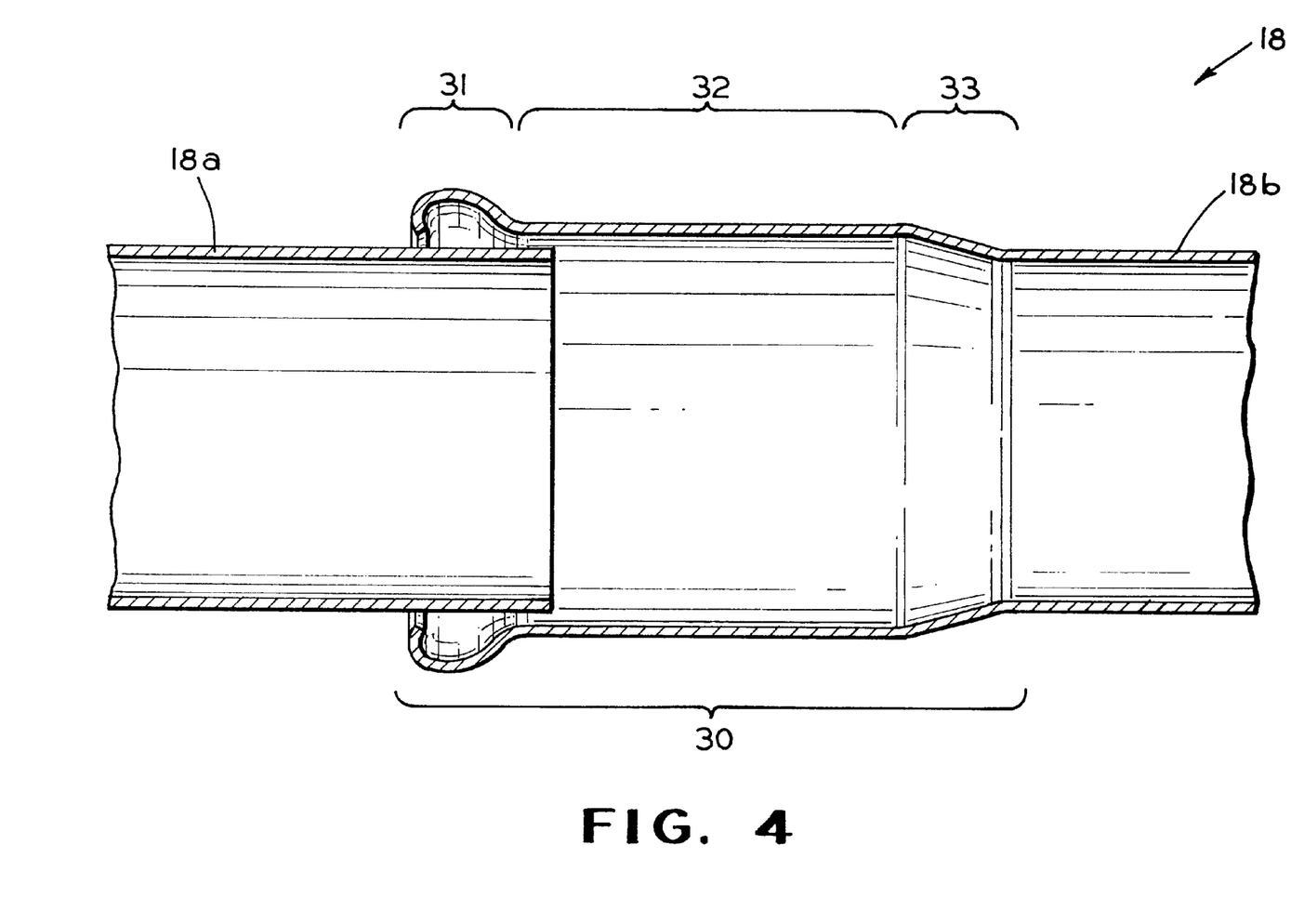

Further axial movement of the first portion 18a of the driveshaft 18 relative to the second end 18b thereof will, at some point, cause a fracture of the driveshaft 18 in the collapse initiation portion 31. As a result, the leading edge of the first portion 18a of the driveshaft 18 is moved axially within the collapse distance control portion 32, as shown in FIG. 4. In the illustrated embodiment, the outer diameter of the first portion 18a of the driveshaft 18 is smaller than the inner diameter of the collapse distance control portion 32. Thus, following the fracture of the driveshaft 18, the leading edge of the first portion 18a of the driveshaft 18 can be moved axially throughout the length of the collapse distance control portion 32 with a relatively small amount of axial force. However, it will be appreciated that the outer diameter of the first portion 18a of the driveshaft 18 can be formed to be approximately equal to the inner diameter of the collapse distance control portion 32. In this situation, following the fracture of the driveshaft 18, the leading edge of the first portion 18a of the driveshaft 18 can be moved axially throughout the length of the collapse distance control portion 32 only with a relatively large amount of axial force necessary to overcome the frictional engagement between the outer surface of the first portion 18a of the driveshaft 18 and the inner surface of the collapse distance control portion 32. In either event, the axial length of the collapse distance control portion 32 can be selected as desired to accommodate a predetermined amount of relative axial movement between the first and second portions 18a and 18b of the driveshaft 18.

Figure 5:
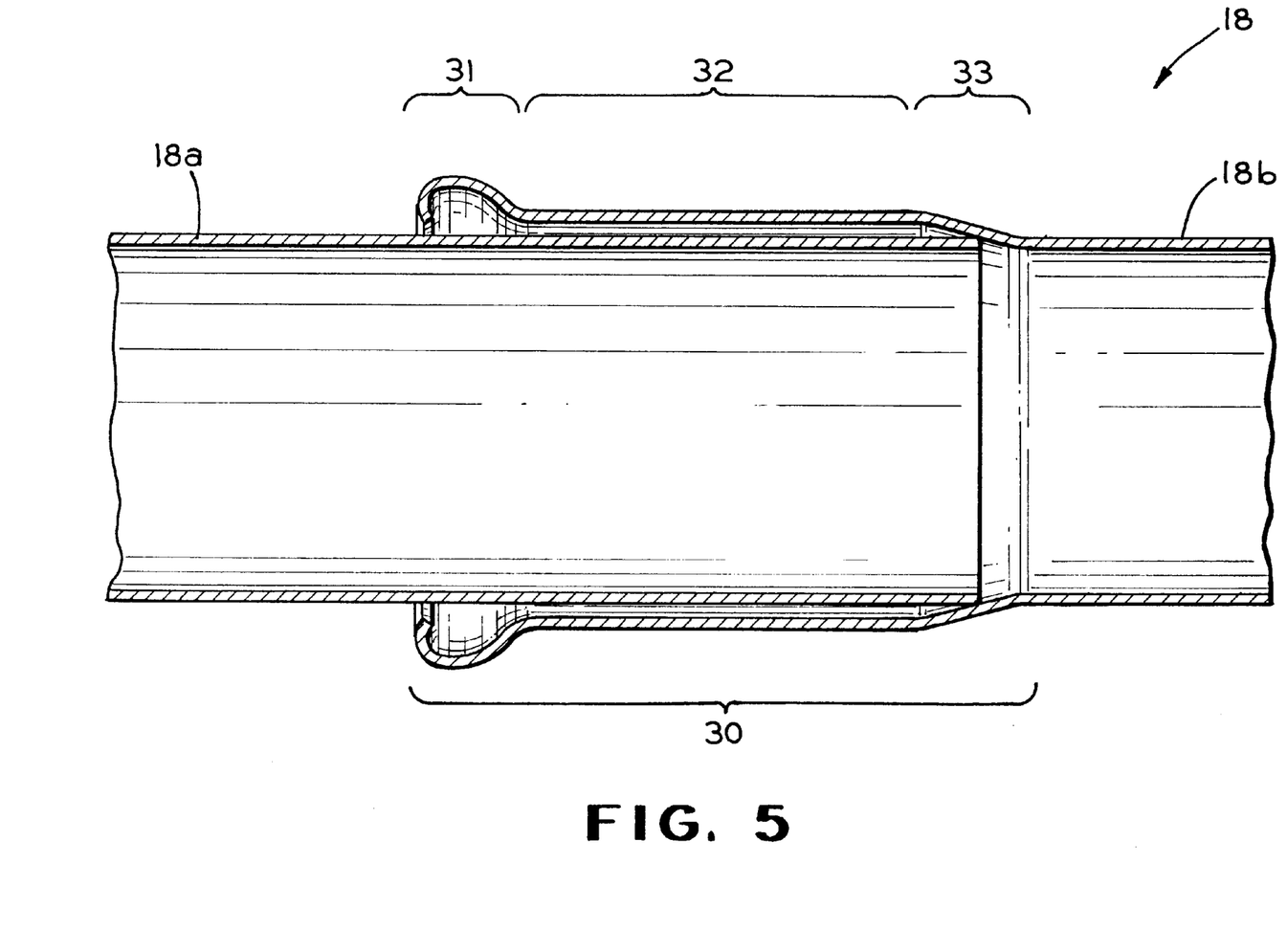
Figure 6:
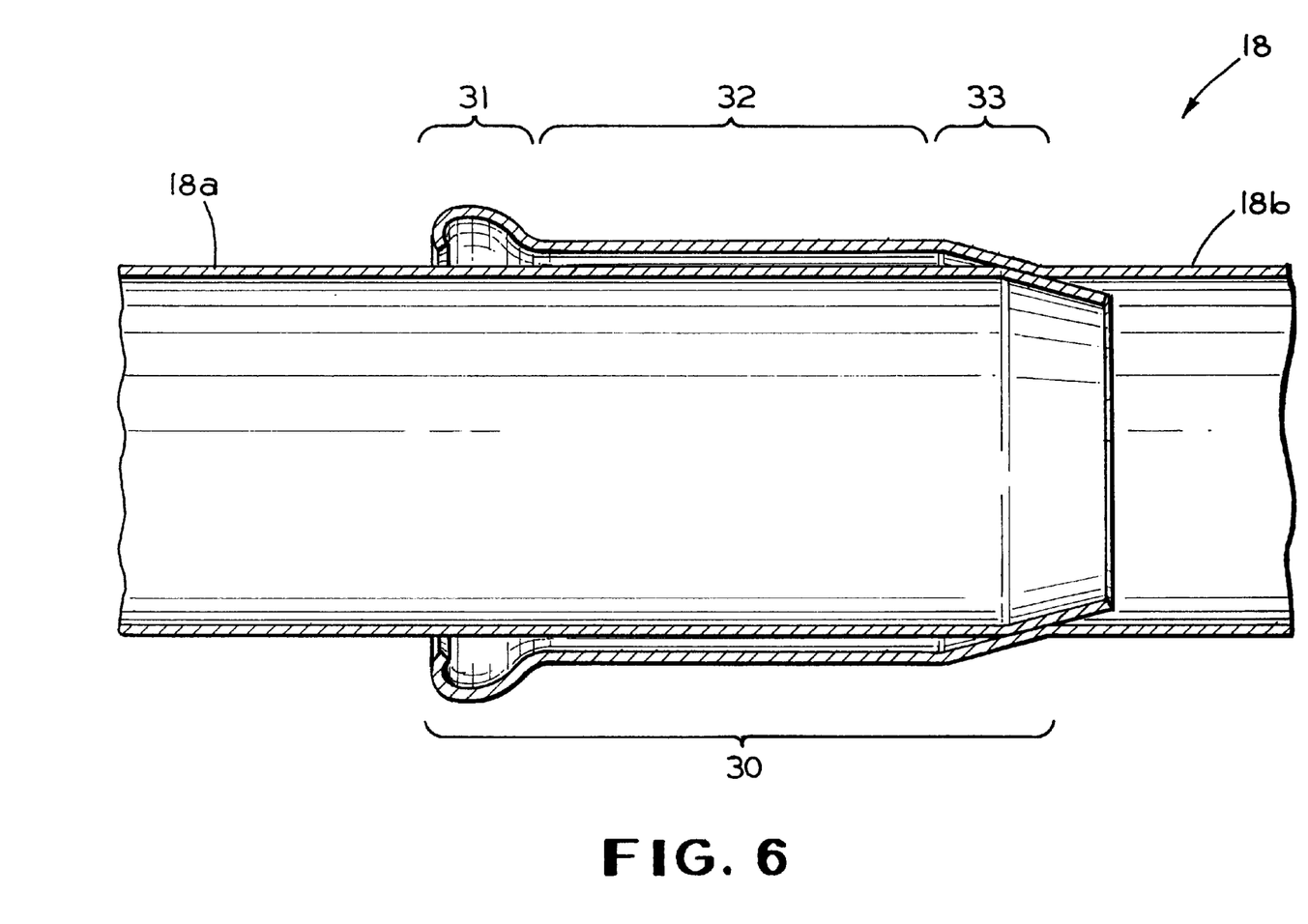

After a predetermined amount of relative axial movement has occurred between the first and second portions 18a and 18b of the driveshaft 18, the leading edge of the first portion 18a will engage the inner surface of the tapered collapse termination portion 33, as shown in FIG. 5. Consequently, further axial movement of the first portion 18a of the driveshaft 18 relative to the second portion 18b will require a much larger amount of axial force than was previously required to move the first portion 18a through the collapse distance control portion 32. As shown in FIG. 6, when such a relatively large amount of axial force is applied to the end portions 22a and 22b of the driveshaft 18, the leading edge of the first portion 18a will be deformed against the inner surface of the tapered collapse termination portion 33. Absent an unusually large axial force, however, the engagement of the leading edge of the first portion 18a of the driveshaft 18 will typically limit or prevent further relative axial movement from occurring between the first and second portions 18a and 18b of the driveshaft.

Figure 7:
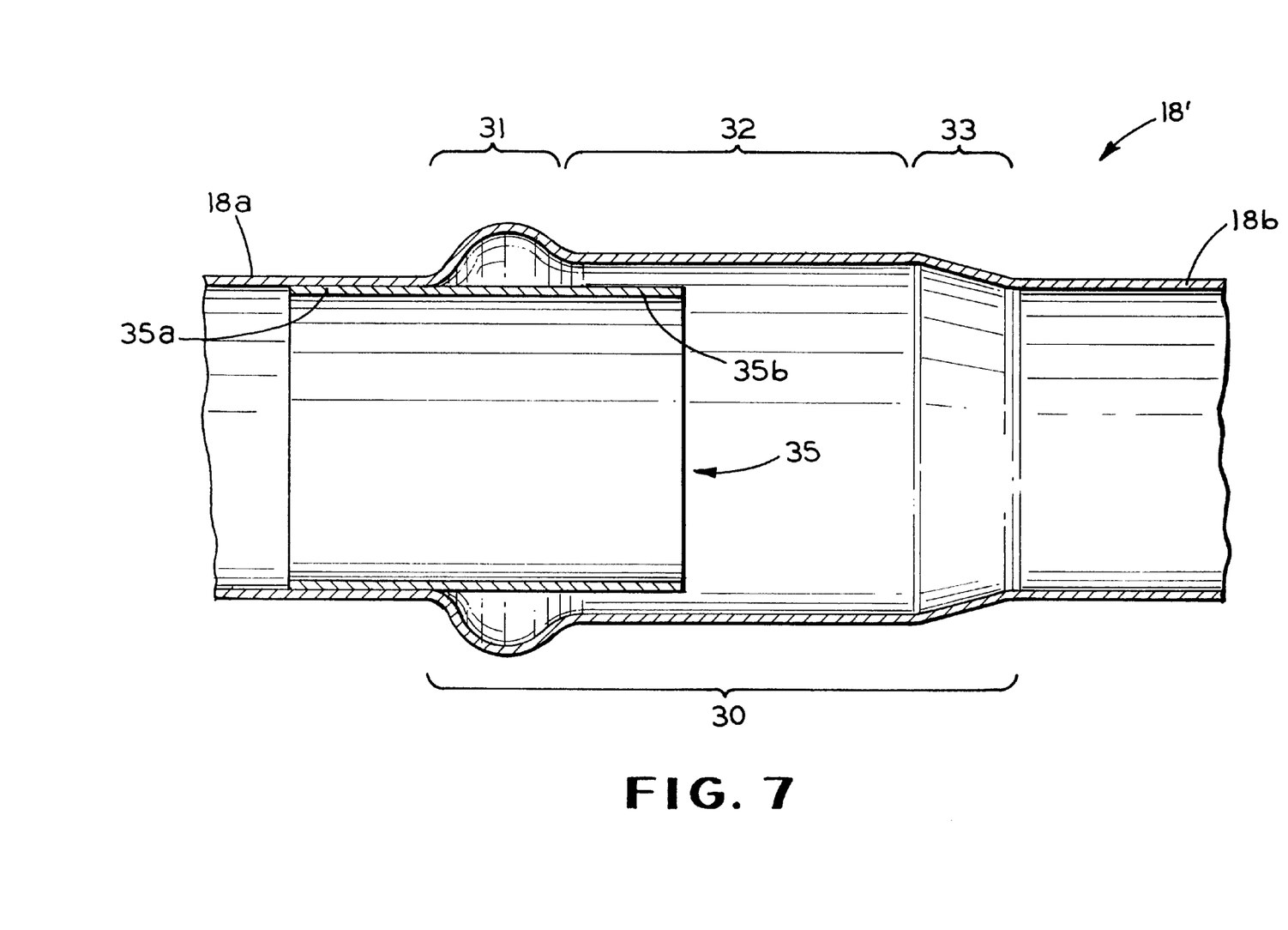
FIG. 7 is an enlarged sectional elevational view similar to FIG. 2 of a portion of a second embodiment of an axially collapsible driveshaft adapted for use in the vehicle drive train assembly illustrated in FIG. 1.

Referring now to FIG. 7, there is illustrated a portion of a second embodiment of an axially collapsible driveshaft, indicated generally at 18', that is adapted for use in the vehicle drive train assembly illustrated in FIG. 1. The driveshaft 18' is, in large measure, identical in structure to the driveshaft 18, and like reference numbers are used to indicate identical components. However, the driveshaft 18' further includes a structure for positively guiding the first portion 18a of the driveshaft 18' as it begins to move axially relative to the second portion 18b thereof, thereby insuring that the first portion 18a is telescopically received within the second portion 18b during collapsing movement. This guiding structure is a hollow cylindrical tube, indicated generally at 35 having a first end 35a that is connected to or supported within the first end 18a of the driveshaft 18' and a second end 35b that extends at least partially within the controlled collapse zone 30. In the embodiment illustrated in FIG. 7, the first end 35a of the guide tube 35 is press fit within the first end 18a of the driveshaft 18'. However, the first end 35a of the guide tube 35 may be connected to or supported within the first end 18a of the driveshaft 18' in any desired manner. In the illustrated embodiment, the second end 35b of the guide tube 35 extends into the collapse distance control portion 32. During collapsing movement of the driveshaft 18', the Inasmuch as the second end 35b of the guide tube 35 is initially positioned within the controlled collapse zone 30, it will prevent the first end 18a of the driveshaft 18' from becoming misaligned with the controlled collapse zone 30 during the above-described relative axial movement. The guide tube 35 may be formed from any desired material, but is preferably formed from a relatively strong, rigid material, such as metal or plastic.

Figure 8:
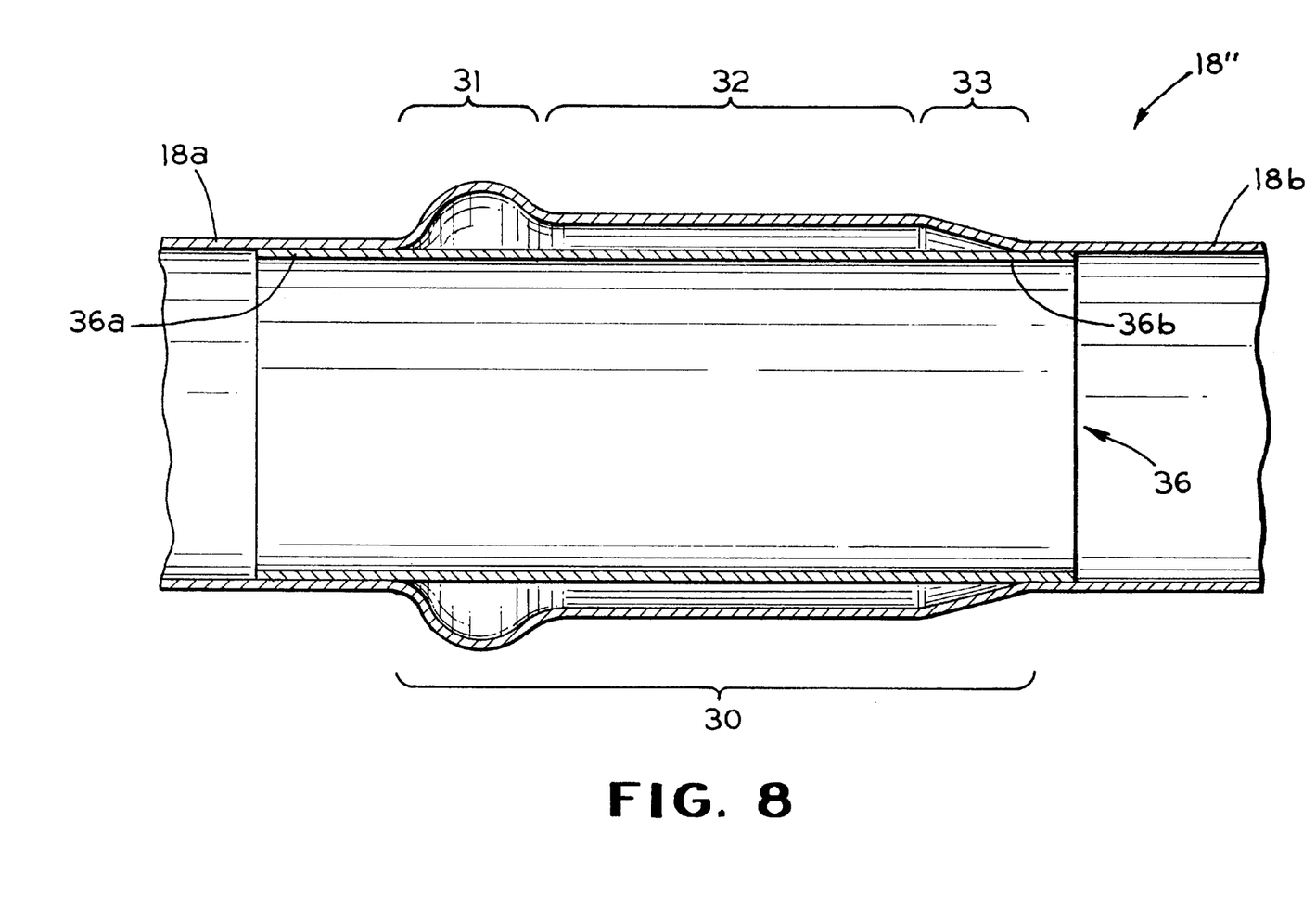
FIG. 8 is an enlarged sectional elevational view similar to FIG. 2 of a portion of a third embodiment of an axially collapsible driveshaft adapted for use in the vehicle drive train assembly illustrated in FIG. 1.

Referring now to FIG. 8, there is illustrated a portion of a third embodiment of an axially collapsible driveshaft, indicated generally at 18", that is adapted for use in the vehicle drive train assembly illustrated in FIG. 1. The driveshaft 18" is, in large measure, identical in structure to the driveshaft 18, and like reference numbers are used to indicate identical components. However, the driveshaft 18" further includes a structure for positively guiding the first portion 18a of the driveshaft 18" as it begins to move axially relative to the second portion 18b thereof, thereby insuring that the first portion 18a is telescopically received within the second portion 18b during collapsing movement. This guiding structure is a hollow cylindrical tube, indicated generally at 36 having a first end 36a that is connected to or supported within the first end 18a of the driveshaft 18" and a second end 36b that is connected to or supported within the second end 18b of the driveshaft 18". In the embodiment illustrated in FIG. 8, the first end 36a of the guide tube 36 is press fit within the first end 18a of the driveshaft 18". However, the first end 36a of the guide tube 36 may be connected to or supported within the first end 18a of the driveshaft 18" in any desired manner. Similarly, the second end 36b of the guide tube 36 is press fit within the second end 18b of the driveshaft 18". However, the second end 36b of the guide tube 36 may be connected to or supported within the first end 18a of the driveshaft 18" in any desired manner. During collapsing movement of the driveshaft 18", the guide tube 36 may move axially with the first end 18a relative to the second end 18b, or it may remain stationary with the second end 18b relative to movement of the first end 18a. In either instance, the guide tube 36 will prevent the first end 18a of the driveshaft 18" from becoming misaligned with the controlled collapse zone 30 during the above-described relative axial movement. The guide tube 36 may be formed from any desired material, but is preferably formed from a relatively strong, rigid material, such as metal or plastic.

Figure 9:
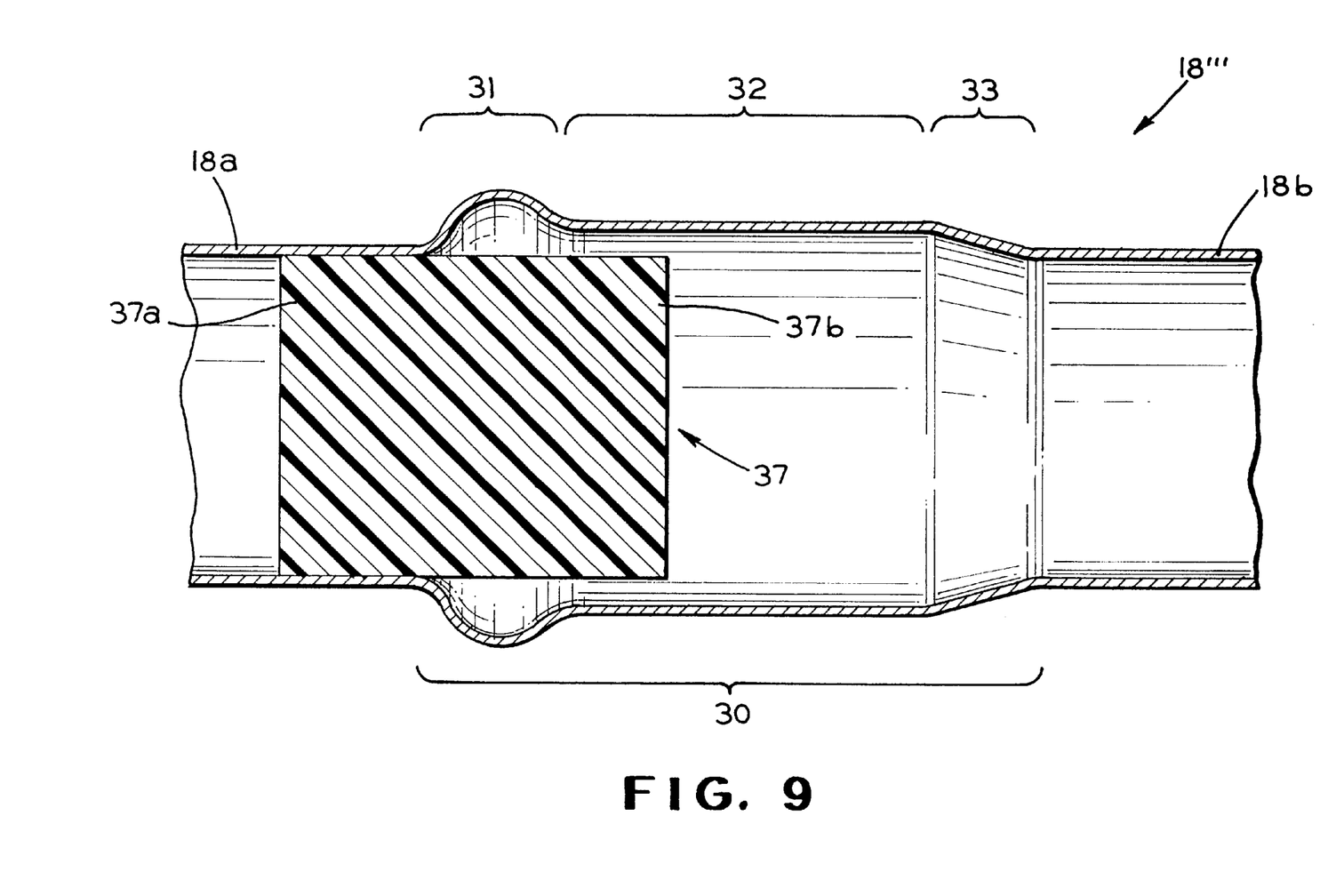
FIG. 9 is an enlarged sectional elevational view similar to FIG. 2 of a portion of a fourth embodiment of an axially collapsible driveshaft adapted for use in the vehicle drive train assembly illustrated in FIG. 1.

Referring now to FIG. 9, there is illustrated a portion of a fourth embodiment of an axially collapsible driveshaft, indicated generally at 18''', that is adapted for use in the vehicle drive train assembly illustrated in FIG. 1. The driveshaft 18''' is, in large measure, identical in structure to the driveshaft 18, and like reference numbers are used to indicate identical components. However, the driveshaft 18''' further includes a structure for positively guiding the first portion 18a of the driveshaft 18''' as it begins to move axially relative to the second portion 18b thereof, thereby insuring that the first portion 18a is telescopically received within the second portion 18b during collapsing movement. This guiding structure is a solid cylindrical member, indicated generally at 37 having a first end 37a that is connected to or supported within the first end 18a of the driveshaft 18''' and a second end 37b that extends at least partially within the controlled collapse zone 30. In the embodiment illustrated in FIG. 9, the first end 37a of the guide member 37 is press fit within the first end 18a of the driveshaft 18'''. However, the first end 37a of the guide member 37 may be connected to or supported within the first end 18a of the driveshaft 18''' in any desired manner. In the illustrated embodiment, the second end 37b of the guide member 37 extends into the collapse distance control portion 32. However, in the manner described above in connection with FIG. 8, the second end 37b of the guide member 37 may extend through the collapse distance control portion 32 into the second end 18b of the driveshaft 18'". In either instance, the guide member 37 will prevent the first end 18a of the driveshaft 18'" from becoming misaligned with the controlled collapse zone 30 during the above-described relative axial movement. The guide member 37 may be formed from any desired material, but is preferably formed from a relatively strong, rigid material, such as metal or plastic.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driveshaft for use in a drive train assembly comprising:
   a first driveshaft portion adapted to be connected to a first portion of the drive train assembly, said first driveshaft portion defining an outer diameter;
   a collapse initiation portion extending from said first driveshaft portion, said collapse initiation portion defining an inner diameter that is greater than said outer diameter of said first driveshaft portion;
   a collapse distance control portion extending from said collapse initiation portion, said collapse distance control portion defining an inner diameter that is greater than said outer diameter of said first driveshaft portion and defining an outer diameter that is less than said inner diameter of said collapse initiation portion;
   a collapse termination portion extending from said collapse distance control portion, said collapse termination portion defining an inner diameter that is always less than said inner diameter of said collapse distance control portion; and
   a second driveshaft portion extending from said collapse termination portion and adapted to be connected to a second portion of the drive train assembly.

2. The driveshaft defined in claim 1 wherein said collapse initiation portion is formed as a bulge.

3. The driveshaft defined in claim 1 wherein said collapse initiation portion is formed having a generally semi-circular cross sectional shape.

4. The driveshaft defined in claim 3 wherein said collapse distance control portion is formed having a generally cylindrical cross sectional shape.

5. The driveshaft defined in claim 4 wherein said collapse termination portion is formed having a generally frusto-conical shape.

6. The driveshaft defined in claim 1 further including a guiding structure that is connected to or supported within said first driveshaft portion.

7. The driveshaft defined in claim 6 wherein said guiding structure extends within said collapse initiation portion.

8. The driveshaft defined in claim 6 wherein said guiding structure extends within said collapse initiation portion and said collapse distance control portion.

9. The driveshaft defined in claim 6 wherein said guiding structure extends within said collapse initiation portion, said collapse distance control portion, and said collapse termination portion.

10. The driveshaft defined in claim 6 wherein said guiding structure extends within said collapse initiation portion, said collapse distance control portion, said collapse termination portion, and said second driveshaft portion.

11. The driveshaft defined in claim 10 wherein said guiding structure is connected to or supported within said second driveshaft portion.

12. The driveshaft defined in claim 6 wherein said guiding structure includes a hollow tube.

13. The driveshaft defined in claim 6 herein said guiding structure includes a solid cylindrical member.

14. A driveshaft for use in a drive train assembly comprising:
    a first driveshaft portion adapted to be connected to a first portion of the drive train assembly, said first driveshaft portion defining an outer diameter;
    a collapse initiation portion extending from said first driveshaft portion, said collapse initiation portion being generally semi-circular in cross sectional shape and defining an inner diameter that is greater than said outer diameter of said first driveshaft portion;
    a collapse distance control portion extending from said collapse initiation portion, said collapse distance control portion defining an inner diameter that is greater than said outer diameter of said first driveshaft portion and defining an outer diameter that is less than said inner diameter of said collapse initiation portion;
    a collapse termination portion extending from said collapse distance control portion; and
    a second driveshaft portion extending from said collapse termination portion and adapted to be connected to a second portion of the drive train assembly.

15. The driveshaft defined in claim 14 wherein said collapse initiation portion is formed as a bulge.

16. The driveshaft defined in claim 14 wherein said collapse distance control portion is formed having a generally cylindrical cross sectional shape.

17. The driveshaft defined in claim 14 wherein said collapse termination portion is formed having a generally frusto-conical shape.

18. The driveshaft defied in claim 14 further including a guiding structure that is connected to or supported within said first driveshaft portion.

19. The driveshaft defined in claim 18 wherein said guiding structure extends within said collapse initiation portion.

20. The driveshaft defined in claim 18 wherein said guiding structure extends within said collapse initiation portion and said collapse distance control portion.

21. The driveshaft defined in claim 18 wherein said guiding structure extends within said collapse initiation portion, said collapse distance control portion, and said collapse termination portion.

22. The driveshaft defined in claim 18 wherein said guiding structure extends within said collapse initiation portion, said collapse distance control portion, said collapse termination portion, and said second driveshaft portion.

23. The driveshaft defined in claim 22 wherein said guiding structure is connected to or supported within said second driveshaft portion.

24. The driveshaft defined in claim 18 wherein said guiding structure includes a hollow tube.

25. The driveshaft defined in claim 18 wherein said guiding structure includes a solid cylindrical member.

26. A driveshaft for use in a drive train assembly comprising:
    a first driveshaft portion adapted to be connected to a first portion of the drive train assembly, said first driveshaft portion defining an outer diameter;
    a collapse initiation portion extending from said first driveshaft portion, said collapse initiation portion defining an inner diameter that is greater than said outer diameter of said first driveshaft portion;

a collapse distance control portion extending from said collapse initiation portion, said collapse distance control portion defining an inner diameter that is greater than said outer diameter of said first driveshaft portion and defining an outer diameter that is less than said inner diameter of said collapse initiation portion;

a collapse termination portion extending from said collapse distance control portion;

a second driveshaft portion extending from said collapse termination portion and adapted to be connected to a second portion of the drive train assembly; and a guiding structure that is connected to or supported within said first driveshaft portion, said guiding structure extending within said collapse initiation portion.

27. The driveshaft defined in claim 26 wherein said collapse initiation portion is formed as a bulge.

28. The driveshaft defined in claim 26 wherein said collapse initiation portion is formed having a generally semi-circular cross sectional shape.

29. The driveshaft defined in claim 26 wherein said collapse distance control portion is formed having a generally cylindrical cross sectional shape.

30. The driveshaft defined in claim 26 wherein said collapse termination portion is formed having a generally frusto-conical shape.

31. The driveshaft defined in claim 26 further including a guiding structure that is connected to or supported within said first driveshaft portion.

32. The driveshaft defined in claim 26 wherein said guiding structure extends within said collapse initiation portion and said collapse distance control portion.

33. The driveshaft defined in claim 26 herein said guiding structure extends within said collapse initiation portion, said collapse distance control portion, and said collapse termination portion.

34. The driveshaft defined in claim 26 wherein said guiding structure extends within said collapse initiation portion, said collapse distance control portion, said collapse termination portion, and said second driveshaft portion.

35. The driveshaft defined in claim 34 wherein said guiding structure is connected to or supported within said second driveshaft portion.

36. The driveshaft defined in claim 26 wherein said guiding structure includes a hollow tube.

37. The driveshaft defined in claim 26 wherein said guiding structure includes a solid cylindrical member.

38. A driveshaft for use in a drive train assembly comprising:

a first driveshaft portion adapted to be connected to a first portion of the drive train assembly, said first driveshaft portion defining an outer diameter;

a collapse initiation portion extending from said first driveshaft portion, said collapse initiation portion defining an inner diameter that is greater than said outer diameter of said first driveshaft portion;

a collapse distance control portion extending from said collapse initiation portion, said collapse distance control portion defining an inner diameter that is greater than said outer diameter of said first driveshaft portion and defining an outer diameter that is less than said inner diameter of said collapse initiation portion;

a collapse termination portion extending from said collapse distance control portion, said collapse termination portion defining an inner diameter that is always less than said inner diameter of said collapse distance control portion; and a second driveshaft portion extending from said collapse termination portion and adapted to be connected to a second portion of the drive train assembly, whereby when a relatively large force is applied against said first and second driveshaft portions, said collapse initiation section is deformed to allow said first driveshaft portion to move within said collapse distance control portion.

39. A method for axially collapsing a driveshaft for use in a drive train assembly comprising the steps of:

(a) providing a driveshaft including a first driveshaft portion adapted to be connected to a first portion of the drive train assembly defining an outer diameter, a collapse initiation portion extending from the first driveshaft portion and having an inner diameter that is greater than the outer diameter of the first driveshaft portion, a collapse distance control portion extending from the collapse initiation portion and having an inner diameter that is greater than the outer diameter of the first driveshaft portion an having an outer diameter that is less than the inner diameter of the collapse initiation portion, a collapse termination portion extending from the collapse distance control portion, and a second driveshaft portion extending from the collapse termination portion and adapted to be connected to a second portion of the drive train assembly; and (b) applying a force against the first and second driveshaft portions so as to deform the collapse initiation section and allow the first driveshaft portion to move within the collapse distance control portion.

* * * * *